United States Patent

Kitai

[15] 3,645,187
[45] Feb. 29, 1972

[54] SHUTTER OPENING AND CLOSING DEVICE

[72] Inventor: Kiyoshi Kitai, 54, Tomishisa-Cho, Shinjaku-ku, Tokyo, Japan

[22] Filed: Dec. 16, 1969

[21] Appl. No.: 885,474

[30] Foreign Application Priority Data

Dec. 18, 1968 Japan.................................43/92541

[52] U.S. Cl. ........................................................95/62
[51] Int. Cl. ....................................................G03b 9/14
[58] Field of Search ..............................................95/62, 63

[56] References Cited

UNITED STATES PATENTS 2,119,831  6/1938  Riddell ....................................95/62
2,338,668  1/1944  Riddell ....................................95/63

*Primary Examiner*—Samuel S. Matthews
*Assistant Examiner*—Monroe H. Hayes
*Attorney*—Robert E. Burns and Emmanuel J. Lobato

[57] ABSTRACT

In a shutter mechanism, a driving member having a plurality of arms is rotatably mounted on a pivoted shutter operating member and is spring biased to turn relative to the operating member when released. In a first portion of its movement, the driving member engages an electronically controlled support member about which it pivots as a fulcrum so as to move the shutter-operating member in a direction to open the shutter. At the end of a selected exposure time the support member disengages from the driving member permitting it to rotate further in the same direction while engaging an abutment on the opposite side of the axis of the driving member so that the operating member is moved in the opposite direction to close the shutter.

12 Claims, 4 Drawing Figures

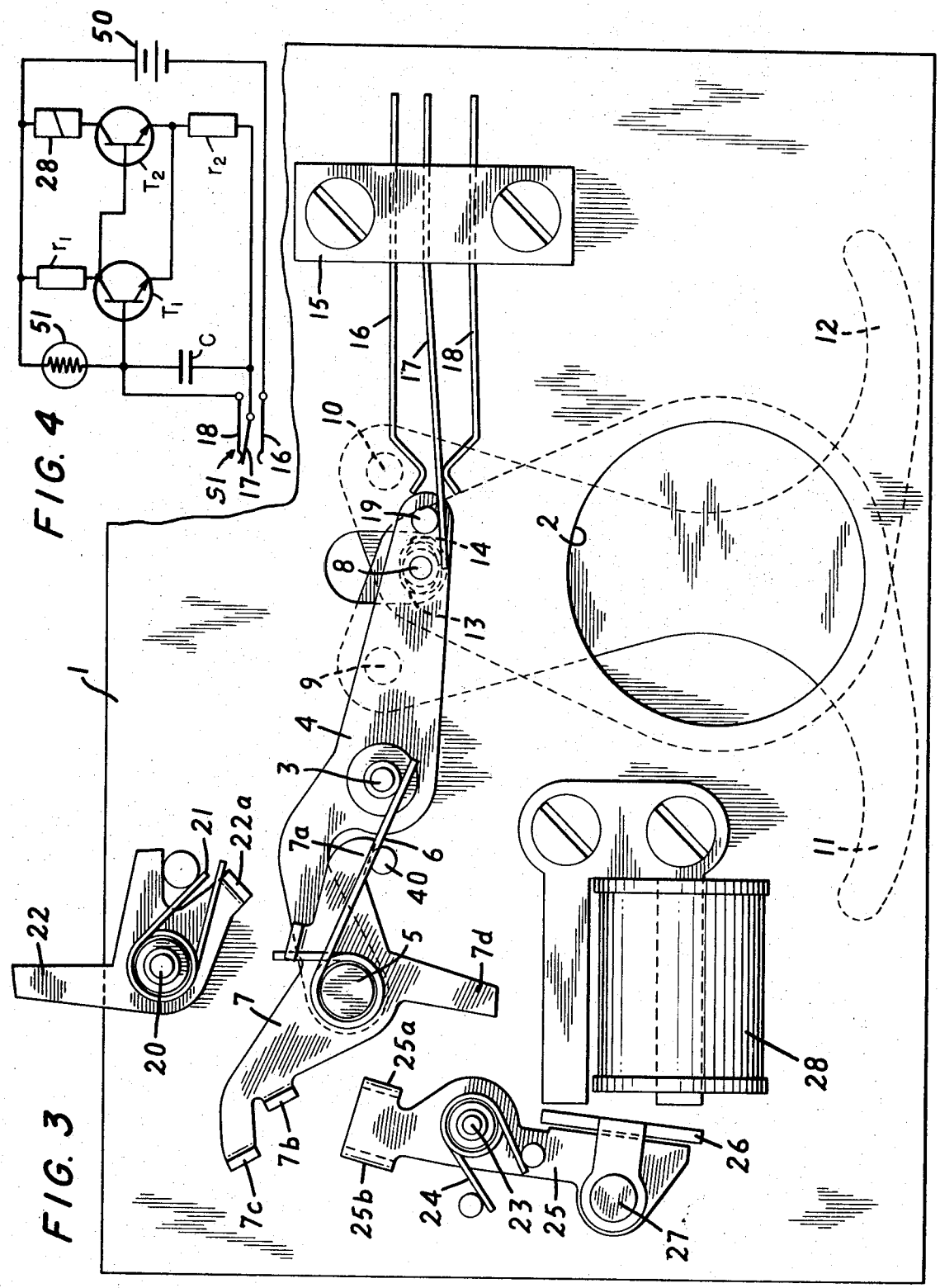

SHUTTER OPENING AND CLOSING DEVICE

The present invention relates to operating mechanism for opening and closing a shutter, for example of a camera.

The shutter of a camera commonly comprises a plurality of sectors which are movable by suitable operating mechanism between a closed position and an open position. One type of operating mechanism that is widely used comprises two separate members, for example rotary rings, one for moving the shutter sectors from an initial closed position to an open position for making an exposure and the other for moving the shutter sectors to a closed position after a selected exposure time. While such mechanism in general operates satisfactorily, it requires a number of precision parts and is accordingly expensive to manufacture.

It is an object of the present invention to provide a shutter-operating mechanism of simplified construction in which the shutter sections are movable first in a shutter-opening direction and then in a closing direction by a single operating member. In accordance with the invention an operating member for both opening and closing the shutter is driven by a single driving member which by a first increment of movement in one direction moves the operating member in a direction to open the shutter and thereafter by a second increment of movement in the same direction moves the operating member in the opposite direction to close the shutter. The driving member is rotated in the opposite direction to reset the mechanism while the shutter remains in closed position.

The shutter-operating mechanism in accordance with the present invention is efficient and precise in its operation and is particularly suitable for use with an electronic timing circuit for automatic or semiautomatic shutter operation.

When a shutter having an opening ring and a closing ring is controlled by an electromagnet which is energized during the opening movement of the shutter to retain the closing ring in set position and is deenergized at the end of a selected exposure time to release the closing ring to close the shutter, it sometimes happens that the electromagnet is not energized quickly enough to keep the closing ring in set position. This results in malfunctioning of the shutter-operating mechanism.

In accordance with the present invention a member which is held by an electromagnet and is released to initiate the closing of the shutter at the end of a selected exposure time, is biased toward set position during an initial portion of the shutter-opening operation and is biased in a direction to initiate closing of the shutter only when the shutter approaches its fully open position. This mode of operation provides a safety factor since the initial bias holds the member in set position and it is accordingly immaterial whether the electromagnet is energized until the reversal of bias occurs. Hence, even if the electromagnet is not energized immediately at the beginning of the shutter-opening movement or if there is a delay in the full activation of the electromagnet, for example by reason of the inductance of the circuit or otherwise, the mechanism still operates satisfactorily.

The nature and advantages of the invention will be more fully understood from the following description in conjunction with the accompanying drawings which show by way of example a preferred embodiment of the invention.

IN THE DRAWINGS

FIG. 3 is a similar view showing the mechanism when the shutter has been closed at the end of a selected exposure time, and FIG. 4 is a simplified schematic diagram of a timing circuit controlling the shutter operating mechanism.

Figure 1:
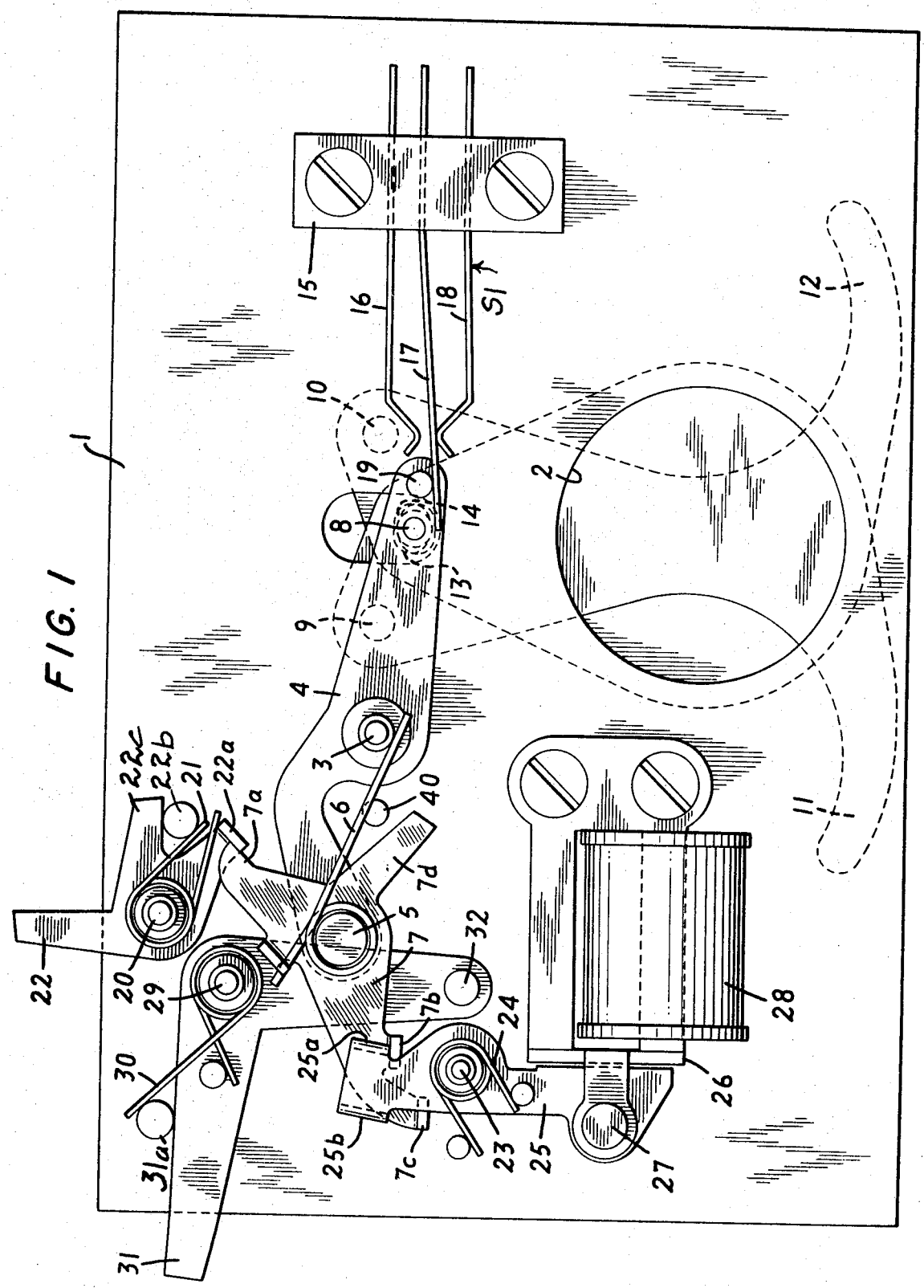
FIG. 1 is a schematic front view of shutter operating mechanism in accordance with the invention shown in set or cocked position.
Figure 2:
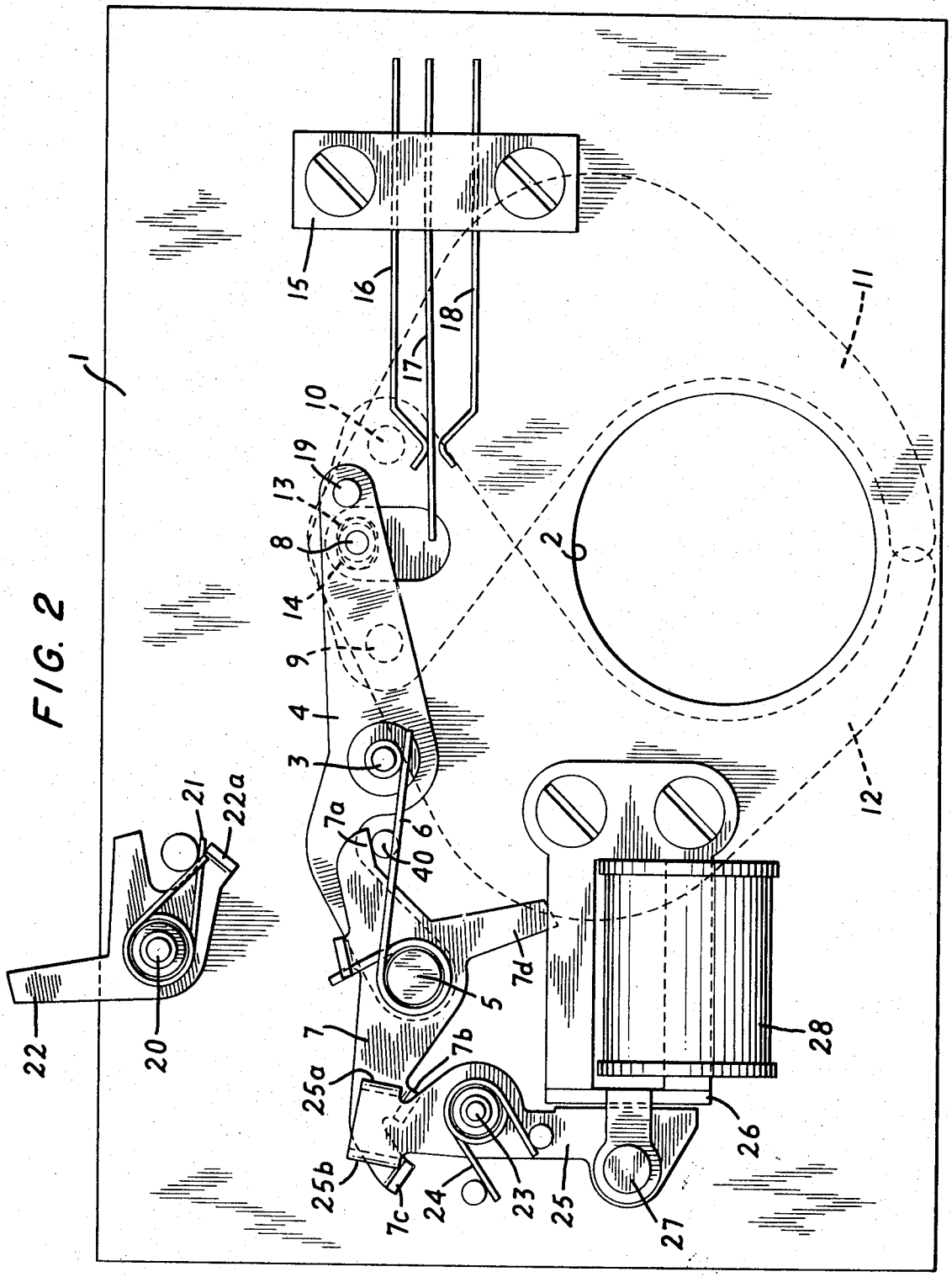
FIG. 2 is a similar view showing the mechanism in a position in which the shutter is open.

In the embodiment illustrated in the drawings, a shutter baseplate 1 is provided with a shutter opening 2. Shutter sectors 11 and 12 are pivotally supported on the baseplate by pivot pins 9 and 10 respectively for pivotal movement between a closed position as shown in FIGS. 1 and 3 and an open position as shown in FIG. 2. It will be understood that suitable means may be provided for variably controlling the size of the opening 2, for example by means of a variable aperture diaphragm or by limiting the opening movement of the shutter sectors. As such aperture control means is well known, it is not illustrated in the drawings.

The shutter sectors 11 and 12 are movable between open and closed position by means of an operating lever 4 which is pivotally mounted on the baseplate 1 by means of a pivot shaft 3. The operating lever 4 is connected with the sectors 11 and 12 by a pin 8 which is carried by one end portion of the lever and engages in elongated holes 13 and 14 of the shutter sectors. It will be seen that the pivotal connection of the operating lever 4 to the shutter sectors is located midway between the pivot pins 9 and 10 by which the sectors are pivotally mounted on the base so that movement of the lever 4 in a counterclockwise direction from the position shown in FIG. 1 moves the sectors to an open position as shown in FIG. 2 while movement of the operating lever 4 in a clockwise direction from the position in FIG. 2 results in movement of the shutter sectors to a closed position as shown in FIG. 3.

The shutter operating lever 4 is movable alternately in opposite directions to open and close the shutter by means of a driving member 7 which is rotatably mounted on the opposite end of the lever 4 by means of a shaft 5. The driving member 7 is shown as a three-armed lever which is biased by a spring 6 to rotate about the shaft 5 in a clockwise direction relative to the operating lever 4. In set position of the shutter mechanism as shown in FIG. 1, the driving member 7 is held against rotation by means of a release lever 22 which is rotatably mounted on the base plate by a shaft 20 and is biased in a clockwise direction by a spring 21. A pin 22b on the base plate engages an arm 22c of the release lever 22 to limit clockwise movement of the lever to a position in which a bent-up part 22a engages an arm 7a of the driving member 7 to hold the driving member in set position as shown in FIG. 1 against the action of its spring 6.

A second arm of the driving member 7 is provided with bent-up portions 7b and 7c adapted to engage respectively downwardly-bent detent portions 25a and 25b of a support lever 25 which is rotatably mounted on the baseplate 1 by means of a shaft 23. The opposite end of support lever 25 carries the armature 26 of an electromagnet 28. The armature 26 is pivotally mounted on the support lever 25 by means of a pivot shaft 27. A light spring 24 biases the support lever 25 in a counterclockwise direction so as to bring the armature 26 against the pole piece of the electromagnet 28.

Rotation of the driving member 7 in a clockwise direction by its spring 6 is limited by engagement of the arm 7a of the driving member with a stationary abutment pin 40 on the baseplate 1. Movement of the driving member 7 in a counterclockwise direction from the position shown in FIG. 3 to the set position shown in FIG. 1 is effected by a setting lever 31 (shown only in FIG. 1) which is pivotally mounted on the baseplate 1 by means of a pivot shaft 29 and is biased in a clockwise direction against a stop 31a by a spring 30. When the setting lever is moved in a counterclockwise direction from the position shown in FIG. 1, a pin 32 on the setting lever engages the third arm 7d of the driving member 7 to rotate the driving member in a counterclockwise direction from the position shown in FIG. 3 to that shown in FIG. 1. The driving member is thereupon held in set position by the release lever 22 as described above.

The electromagnet 28 is controlled by a suitable timing circuit, a simplified wiring diagram of which is shown in FIG. 4. The circuit is shown as comprising the electromagnet 28, two transistors T1 and T2, an electric power source 50, a photoelectric element for example a photoresistor 51, a capacitor C, two resistances r1 and rr2 and a changeover switch S1. The changeover switch as shown in FIGS. 1 to 3 comprises a movable spring contact 17 between two stationary contacts 16 and 18 all mounted on the baseplate 1 by means of insulating material 15. The movable contact 17 is engageable by a pin 19 carried by the right-hand arm of the operating lever 4 as seen in FIG. 1. When the operating lever 4 is in shutter-closed position as seen in FIGS. 1 and 3, the pin 19 holds the movable spring contact 17 in engagement with the contact 18 and away from the contact 16. When the operating lever 4 moves toward shutter-opening position, the movable contact 17 is released and by its own bias moves upwardly to engage the contact 16 and to disengage the contact 18. It will be seen that when the movable contact 17 is in engagement with the contact 18 (FIG. 4) the capacitor C is shorted and hence discharged and the power source circuit is open. When the movable contact 17 is moved into engagement with the contact 16, the electromagnet 28 is connected to the power source 50 through the transistor T2 and resistance r2. Hence, the electromagnet 28 is energized as long as the switch S1 is in this position and the transistor T2 is in a conductive state. It will be recognized that the transistors T1 and T2 are connected in a flip-flop circuit so that when the transistor T1 becomes conductive the transistor T2 ceases to conduct and the electromagnet 28 is thereby deenergized.

OPERATION

When the shutter mechanism in accordance with the invention is in set or cocked position ready to make an exposure, the parts are in the position shown in FIG. 1. The shutter is closed and the driving member 7 is held against rotation by the release lever 22. The magnet armature 26 is held against the pole piece of the magnet 28 by the light spring 24. The pin 19 on the operating lever 4 is in engagement with the movable contact 17 of the changeover switch S1 to hold it out of engagement with the contact 16 and in engagement with the contact 18. The magnet 28 is thereby disconnected from the power source 50 and hence deenergized while the capacitor C is short-circuited and thus discharged.

Operation of the mechanism to make an exposure is initiated by turning the release lever 22 in a counterclockwise direction to release the arm 7a of the driving member 7 from the bent-up portion 22a of the release lever. The driving member 7 is thereby released to be turned in a clockwise direction relative to the operating lever 4 by its spring 6. The bent-up portion 7b of the driving member 7 is in engagement with the bent-down portion 25a of the support lever 25 which serves as a fulcrum so that rotation of the driving member 7 in a clockwise direction causes the shaft 5 to move downwardly and thereby rotate the operating lever 4 about its pivot 3 in a counterclockwise direction. The pin 8 on the operating lever 4 moves upwardly to move the sectors 11 and 12 in an opening direction. Rotation of the driving member 7 in a clockwise direction continues until the arm 7a engages an abutment pin 40 on the baseplate 1 whereupon the shutter is fully open as seen in FIG. 2.

Near the end of the opening movement, the bent-up portion 7c of the driving member 7 engages the downturned portion 25b of the support lever 25 by reason of the movement and change in angle of the driving member. Upon further movement of the driving member, the bent-up portion 7b is disengaged from the turned-down portion 25a of the support lever 25. By reason of the position of the driving member and the angle at which the bent-up portion 7b is disposed, engagement of the portion 7b with the downturned portion 25a provides a component of force tending to turn the support lever 25 in a counterclockwise direction and thereby hold the armature 26 against the pole piece of the magnet 28 during an initial portion of the opening operation. However, in a final portion of the opening operation, engagement of the bent-up portion 7c of the driving member with the downturned portion 25b of the support lever 25 provides a force component tending to turn the support lever in a clockwise direction. This force is sufficient to overcome the force of the light spring 24 so that clockwise movement of the support lever 25 is prevented only by the attraction of the armature 26 by the electromagnet 28 when the electromagnet is energized.

When the operating lever 4 starts to move from the position shown in FIG. 1 in a direction to open the shutter, the pin 19 carried by the lever 4 is disengaged from the movable contact 17 of the changeover switch S1 so that the movable contact by its inherent spring bias is removed from the contact 18 and engages the contact 16. This results in connecting the electromagnet 28 to the power source 50. As the base potential of the transistor T1 is low by reason of the discharged condition of the capacitor C, the transistor T1 is in a nonconducting state with the result that the transistor T2 is conducting. Power is thereby supplied to energize the magnet 28 and attract the armature 26 to hold the support lever 25 in the position shown in FIG. 1. Since the support lever 25 is held in this position by the engagement of portion 7b of the driving member 7 with the detent portion 25a of the support lever during an initial portion of the opening operation, it is not necessary for the electromagnet 28 to be energized immediately and fully at the start of the opening operation. Hence, precise operation of the changeover switch S1 is not required and it is likewise immaterial whether there is a delay in the electromagnet becoming fully energized, for example by reason of the inductance of the circuit or a weak power supply. It is sufficient for the electromagnet to be energized by the time the portion 7c of the driving member 7 engages the second detent portion 25b of the support lever 25 and thereby reverses the bias on the support member near the end of the opening movement.

Disengagement of the contact 17 from contact 18 of the changeover switch S1 removes the short circuit from the capacitor C whereupon the capacitor starts to charge at a rate dependent on the resistance of the photoelectric element 51 which senses the brightness of the subject to be photographed. The charge rate of the capacitor C may, if desired, be otherwise controlled, for example by resistances in parallel or in series with the photosensitive element 51 or by the use of a selected resistance instead of the photoelectric element. When the capacitor C has been charged to a selected potential, the transistor T1 becomes conductive whereupon the transistor T2 is rendered nonconductive and hence current is cut off from the electromagnet 28.

During the final portion of the shutter-opening operation and while the shutter remains open as shown in FIG. 2, the support member 25 is held in set position by the electromagnet 28 against the bias provided by a component of the engagement force between part 7c of the driving member 7 and part 25b of the support lever tending to turn the support lever in a clockwise direction. When the electromagnet 28 is deenergized at the end of a selected exposure time as controlled by the timing circuit shown in FIG. 4 and described above, the support lever 25 is released and turns in a clockwise direction so as to disengage the detent portion 25b of the support lever from the bent-up portion 7c of the driving member 7. The driving member is thereby released to continue its rotation in a clockwise direction under the action of the spring 6. As the arm 7a of the driving member is in engagement with the abutment pin 40 which now acts as a fulcrum, continued rotation of the driving member results in upward movement of the shaft 5 and hence in clockwise movement of the operating lever 4 about its pivot 3. Pin 8 carried by the operating lever 4 is thereby moved downwardly to move the shutter sectors 11 and 12 to closed position as shown in FIG. 3. Pin 19 on the operating lever 4 engages the movable contact 17 of the changeover switch S1 so as to disengage it from contact 16 and bring it into engagement with contact 18 thereby restoring the timing circuit to its initial condition.

The shutter mechanism is reset by moving the setting lever 31 (shown only in FIG. 1) in a counterclockwise direction so that the pin 32 carried by the setting lever engages an arm 7d of the driving member 7 to turn the driving member in a counterclockwise direction against the action of its spring 6. The driving member is rotated in this manner from the position shown in FIG. 3 to that shown in FIG. 1, whereupon the turned-up portion of the spring-biased release lever 22 engages arm 7a of the driving member to hold the driving member in set position. It will be noted that during the setting operation, an upward force is exerted on the driving member 7 and hence on the shaft 5. This tends to rotate the operating lever 4 in a clockwise direction and thus in a direction to close the shutter. However, as the shutter is already fully closed, it remains in closed condition during the resetting of the driving member 7.

It will be seen that in the operation described, the support lever 25 performs the function of retaining one arm of the driving member 7 thereby providing a fulcrum for the driving member during the opening of the shutter and thereafter performs the function of controlling the exposure time at the end of which the driving member 7 is released to effect a closing of the shutter. While the exposure time is controlled by an electronic timing circuit in the example of the invention that has been described, it may alternatively be controlled mechanically, for example by changing the inertia of the supporting lever 25 and the amount of interengagement between the upturned portion 7c of the driving member 7 and the detent portion 25b of the support member. Still other modifications may be made while retaining the structure and operation characterizing the invention.

What I claim and desire to secure by Letters Patent is:

1. In a shutter mechanism, the combination of a shutter sector movable between an open position and a closed position, an operating member for moving said sector between open and closed positions, a driving member rotatably mounted on said operating member and having a plurality of arms, means for rotating said driving member relative to said operating member, a release member engageable with an arm of said driving member to hold it releasably in set position, a movable support member engageable by an arm of said driving member to provide a first fulcrum about which said driving member turns to move said operating member in a sector-opening direction upon release of said driving member by said release member to rotate in an operating direction, abutment means engageable by an arm of said driving member to provide a second fulcrum about which said driving member turns to move said operating member in a sector-closing direction upon further rotation of said driving member in said operating direction, said support member being movable between a first position in which it engages said arm of said driving member and a second position in which it releases said arm, and timing means for releasably holding said support member in said first position, said driving member acting on said support member to urge it toward said first position during a first increment of movement of said driving member from said set position and to urge it toward said second position during a second increment of said movement.

2. A shutter mechanism according to claim 1, in which said means for rotating said driving member comprises spring means acting between said driving member and said operating member.

3. A shutter mechanism according to claim 2, in which said support member is pivotally mounted and has two contact portions one of which is engageable by said driving member to exert a component of force to rotate said support member in one direction about its pivot toward said first position and the other of which is engageable by said driving member to exert a component of force to rotate said support member in the opposite direction.

4. A shutter mechanism according to claim 2, in which said support member is pivotally mounted and in which said timing means comprises electromagnetic means operable to disengage said support member from said driving member after movement of said operating member in a sector-opening direction and thereby initiate movement of said operating member in a sector-closing direction.

5. A shutter mechanism according to claim 4, in which said support member has two contact portions one of which is engageable by said driving member to exert a component of force to maintain engagement of said support member with said driving member and the other of which is engageable by said driving member to exert a component of force to disengage said support member from said driving member.

6. A shutter mechanism according to claim 4, further comprising an electronic timing circuit controlling said electromagnetic means to disengage said support member from said driving member a selected time after initiation of movement of said operating member in a sector-opening direction.

7. A shutter mechanism according to claim 6, in which said timing circuit includes a switch operated by said operating member.

8. A shutter mechanism according to claim 5, in which said electromagnetic means comprises an electromagnet and an armature carried by said support member and attractable by said electromagnet, and in which engagement of said driving member with said one contact portion of the support member exerts a component of force to bias said armature in a direction toward said electromagnet.

9. A shutter mechanism according to claim 8, further comprising an electronic timing circuit for energizing said electromagnet upon initiation of movement of said operating member in a sector-opening direction and to deenergize said electromagnet to disengage said support member from said driving member and thereby initiate movement of said operating member in a sector-closing direction after a selected interval of time.

10. A shutter mechanism according to claim 1, in which said release member comprises a pivotally mounted spring-biased lever having a contact portion engageable with an arm of said driving member to hold said driving member in set position.

11. A shutter mechanism according to claim 2, further comprising a setting lever engageable with an arm of said driving member when said operating member is in sector-closed position to move said driving member against the action of said spring means to set position while said operating member remains in sector-closed position.

12. In a shutter mechanism, the combination of an operating member movable in one direction to open a shutter and movable in the opposite direction to close the shutter, means for driving said operating member comprising a driving member rotatably mounted on said operating member and spring means acting between said operating member and said driving member to rotate said driving member relative to said operating member, said driving member being movable by said spring means through a first increment of movement in one direction to move said operating member in a shutter-opening direction and movable through a second increment of movement in the same direction to move said operating member in a shutter-closing direction, setting means for moving said driving member in the opposite direction to a set position while said operating member remains in a shutter-closed position, a pivoted member engageable with said driving member to control its movement and electromagnetic means for controlling said support member comprising an electromagnet and an armature carried by said support member and engageable with said electromagnet, said support member having a first contact portion engageable by said driving member to exert a component of force on said support member in a direction to bias said armature in a direction toward said armature and a second contact portion engageable by said driving member to exert a component of force on said support member in the opposite direction.

* * * * *